United States Patent
Imamatsu

(10) Patent No.: US 6,687,901 B1
(45) Date of Patent: Feb. 3, 2004

(54) METHOD AND APPARATUS FOR UPDATING SOFTWARE IN RADIO TERMINAL DEVICE

(75) Inventor: Ken'ichi Imamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 09/634,389

(22) Filed: Aug. 9, 2000

(30) Foreign Application Priority Data

Sep. 6, 1999 (JP) ............................................ 11-251065

(51) Int. Cl.$^7$ ............................................... G06F 9/44
(52) U.S. Cl. ...................... 717/173; 717/170; 717/171; 717/172; 717/177; 717/178; 709/217; 455/418; 455/419; 455/420
(58) Field of Search .............................. 717/168, 169, 717/170, 171, 172, 173, 174, 175, 177, 167, 176–178; 455/420, 418, 419; 370/338; 711/154, 162; 709/217

(56) References Cited

U.S. PATENT DOCUMENTS

| | | | | | |
|---|---|---|---|---|---|
| 5,430,877 | A | * | 7/1995 | Naylor ........................ | 717/171 |
| 5,802,585 | A | * | 9/1998 | Scales et al. ............... | 711/154 |
| 5,848,064 | A | * | 12/1998 | Cowan ........................ | 370/338 |
| 5,896,566 | A | * | 4/1999 | Averbuch et al. ........... | 455/419 |
| 5,901,320 | A | * | 5/1999 | Takahashi et al. .......... | 717/170 |
| 5,931,905 | A | * | 8/1999 | Hashimoto et al. ......... | 709/217 |
| 6,202,135 | B1 | * | 3/2001 | Kedem et al. .............. | 711/162 |
| 6,263,497 | B1 | * | 7/2001 | Maeda et al. ............... | 717/170 |
| 6,266,810 | B1 | * | 7/2001 | Tanaka et al. .............. | 717/173 |
| 6,308,061 | B1 | * | 10/2001 | Criss et al. .................. | 455/418 |
| 6,397,060 | B1 | * | 5/2002 | Oikawa ....................... | 455/420 |
| 6,438,748 | B1 | * | 8/2002 | Gard et al. ................. | 717/168 |
| 6,493,871 | B1 | * | 12/2002 | McGuire et al. ............ | 717/173 |
| 6,496,979 | B1 | * | 12/2002 | Chen et al. ................. | 717/178 |
| 6,553,507 | B1 | * | 4/2003 | Cohen .......................... | 714/4 |

FOREIGN PATENT DOCUMENTS

| | | |
|---|---|---|
| JP | 61-220535 | 9/1986 |
| JP | 62-38624 | 2/1987 |
| JP | 5-57945 | 3/1993 |
| JP | 6-311200 | 11/1994 |
| JP | 7-219974 | 8/1995 |
| JP | 9-190353 | 7/1997 |
| JP | 10-198554 | 7/1998 |

OTHER PUBLICATIONS

Title: In place reconstruction of delta compressed files, author: Burns et al, ACM, 1998.*

Title: Dynamic program modification in telecommunications systems, author: Frieder et al, IEEE, Jul. 1989.*

Title: Updating Software And Configuration Data in A Distributed Communication Network, author: Symborski, IEEE, 1988.*

Title: Distributing Mobility Agent Hierarchically under Frequent Location Updates, author: Forsberg et al, IEEE, 1999.*

Title: Group communications algorithm for dynamically updating in distributed systems, author: Higaki, H., IEEE, 1994.*

* cited by examiner

*Primary Examiner*—Chameli C. Das
(74) *Attorney, Agent, or Firm*—Katten Muchin Zavis Rosenman

(57) ABSTRACT

A method for updating software in a radio terminal device of a mobile communication system, wherein a base station and radio terminal devices are connected mutually through radio communication channels, including the steps of notifying version information on a control-software of the radio terminal device to a software-supply device connected to a network by the radio terminal device, determining a necessity of updating the control-software by comparing the version information received from the radio terminal device with latest version information stored in and managed by the software-supply device, and downloading new control-software that is appropriate to update the version of the control-software to the radio terminal device by the software-supply device if updating of the control-software is needed.

11 Claims, 14 Drawing Sheets

FIG. 7 FLOWCHART 1

FIG. 8 FLOWCHART 2

METHOD AND APPARATUS FOR UPDATING SOFTWARE IN RADIO TERMINAL DEVICE

BACKGROUND OF THE INVENTION

1. Field of the Invention

The present invention relates to a method and an apparatus for updating software in a radio terminal device. More particularly, the present invention relates to a method and an apparatus in a radio terminal device in a mobile communication system in which a base station and radio terminal devices are connected mutually through radio communication channels.

2. Description of the Related Art

In conventional radio terminal devices, it is already known that updating of software is processed by downloading update-used software (software data which is used for updating software in a device) through a radio communication channel to a programmable ROM, instead of by replacing a memory such as a ROM that contains a control-software or by rewriting contents of the programmable ROM directly with connecting an external device thereto.

FIG. 1A shows the structure of a prior system to modify software of a radiotelephone disclosed in Japanese Laid-Open Patent Application No. 61-220535. In the figure, a ROM 78 stores software necessary to obtain new software data, and a ROM 79 stores software determining whether the software stored in the ROM 78 is correct. Summarizing the software update process in the conventional radiotelephone, under the control of the software in the ROMs 78 and 79, a CPU 76 receives new software transmitted from a software-supply device (not shown), and the software is demodulated by a modem 74. Subsequently, the CPU 76 stores the new software in a main memory 77 and sets the new software as main memory data.

However, the ROM 78 stores comparatively large software that overlaps with the main memory 77, and is related to radio communication controls (for example, a call control and a transmitter-receiver control). In other words, overlapping the software between the ROM 78 and the main memory 77 is not only a waste of memory space in the ROM 78 and in the main memory 77 but also a cause of the increase in the size of the ROM 78. Consequently, it is difficult to achieve miniaturization and cost reduction of the mobile communication system. Moreover, the ROM 78 must be replaced when software related to control of the radio communication is revised by a revision of communication service.

FIG. 1B shows the structure of a prior radio communication device disclosed in Japanese Laid-Open Patent Application No. 62-38624. Summarizing a case to improve a function of a present operating control-program stored in an EEPROM 88, update-used software is transmitted from a base station and is transferred through a duplexer 83, a receiver 84, and a modem 86. The update-used software is then data-processed through a processor 89 and a RAM 90 to be stored in the EEPROM 88.

The above-described procedure to overwrite the currently operating program with the update-used program has a possibility that the currently operating program might get damaged while the currently operating program downloads the update-used software. Therefore, it is unsafe to update software in such the device.

As described above, the prior method for updating software is nothing but a substitution of downloading the update-used software through the radio line to replacing memory such as a ROM. Furthermore, in the system of Japanese Laid-Open Patent Application No. 61-220535, the large scaled ROMs 78 and 79 are necessary besides the main memory 77, and in the system of Japanese Laid-Open Patent Application No. 62-38624, the method for updating the software is unsafe.

SUMMARY OF THE INVENTION

Accordingly, it is a general object of the present invention to provide a method and an apparatus for updating software efficiently and safely with a simple structure and control in a radio terminal device, in which the disadvantages described above are eliminated.

The above-described object of the present invention are achieved by a method for updating software in a radio terminal device of a mobile communication system, wherein a base station and radio terminal devices are connected mutually through radio communication channels, including the steps of:

notifying version information on a control-software presently involved in operations of the radio terminal device to a software-supply device connected to a network by the radio terminal device;

determining a necessity of updating the control-software by comparing the version information received from the radio terminal device with latest version information stored in and managed by the software-supply device; and downloading new control-software that is appropriate to update the version of the control-software to the radio terminal device by the software-supply device if updating of the control-software is needed.

Other objects, features and advantages of the present invention will become more apparent from the following detailed description when read in conjunction with the accompanying drawings.

DESCRIPTION OF THE PREFERRED EMBODIMENTS

A description will now be given of preferred embodiments of the present invention, with reference to the accompanying drawings.

Figure 1A:
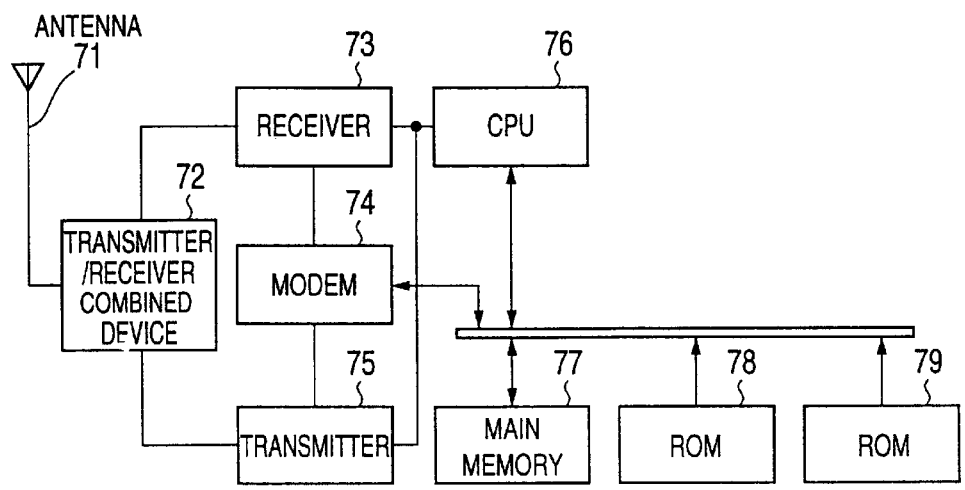
FIGS. 1A and 1B are diagrams describing a prior art.
Figure 1B:
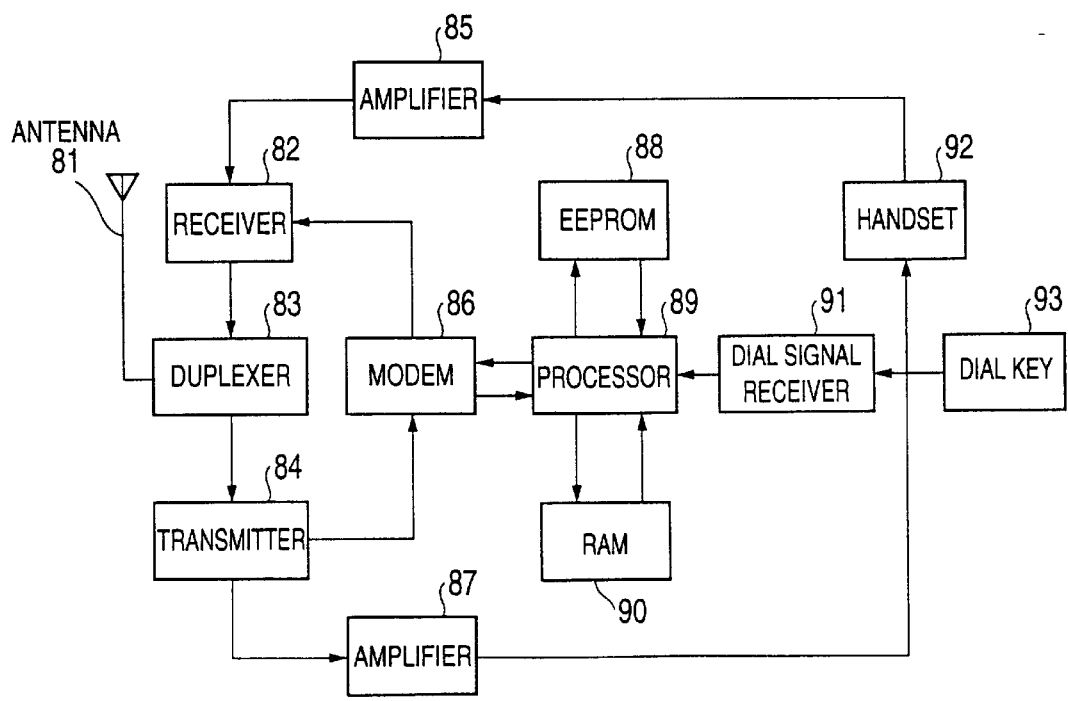
Figure 2:
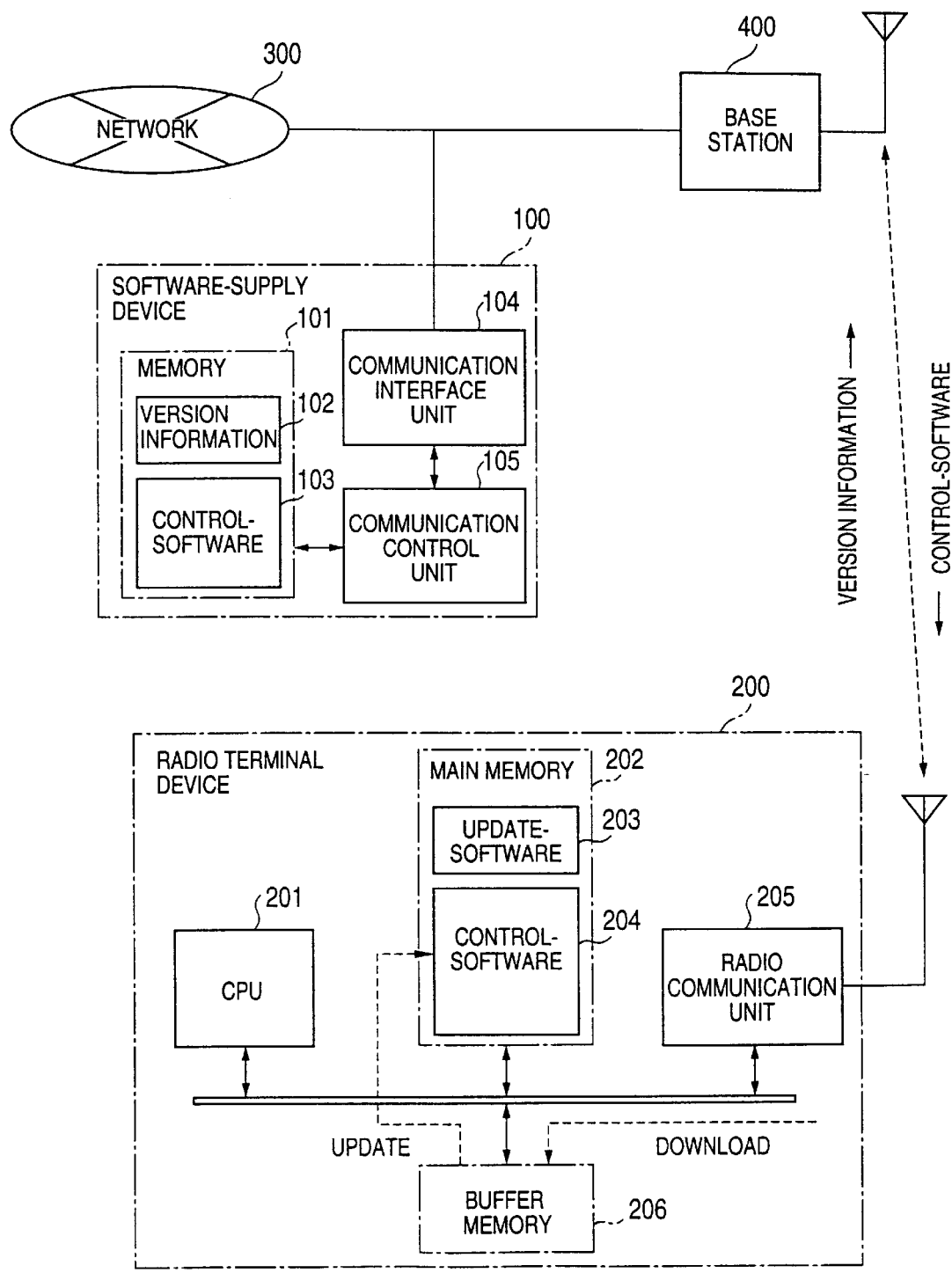
FIG. 2 is a diagram describing a principle of the present invention.

FIG. 2 shows a principle of the present invention that eliminates the above-described disadvantages of the prior art. A method for updating software in the present invention is described below. In the method for updating software in a radio terminal device 200 of a mobile communication system, wherein a base station 400 and radio terminal devices 200 are connected mutually through radio communication channels, the radio terminal device 200 reports version information concerning its present operating software that is involved in operations of the device, to a software-supply device 100 connected to a network 300. The software-supply device 100 compares reported version information of a control-software 204 of the radio terminal device 200 with the latest control-software version information stored in and controlled by the software-supply device 100. Subsequently, the software-supply device 100 decides if update of the software in the radio terminal device 200 is necessary. If so, the software-supply device 100 selects an appropriate control-software to update the reported version of the software, and downloads the update-used software to the radio terminal device 200.

The present invention includes the centralized software-supply device 100 managing each version of the control-software 204 so as to control the complicated management of the control-software versions securely and efficiently on the network 300. It is unnecessary for the software-supply device 100 to manage each version of software in the radio terminal devices since each radio terminal device 200 takes lead to update the software version individually. The control-software 204 in each radio terminal device 200 is updated as the radio terminal device 200 accesses the software-supply 100 device voluntarily and reports its control-software version. Accordingly, the software-supply device 100 does not need to notify information such as the latest software version through the network 300 to the radio terminal device 200 without modifying a present network system. This software updating system can be easily installed to the present network system because the software-supply device 100 may be treated as a server connecting to the network 300. Thus, with its simple structure and control of the software updating process, the present invention efficiently manages the versions of the control-software 204 in the radio terminal device 200.

In the radio terminal device 200, a CPU 201 stores the update-used software under the control of the present control-software 204 to a buffer memory 206. Subsequently, the CPU 201 updates corresponding parts in the present control-software 204 under the control of update-software 203 with the update-used software stored in the buffer memory 206. Then, the update-software 203 returns the control of the system to the updated control-software.

With the structure of downloading the update-used software to the buffer memory 206 that is different from a main memory 202 under the control of the present control-software 204, the CPU 201 utilizes the present control-software 204 fully and does not rewrite the update-used software directly to the currently operating control-software 204, so that the CPU 201 can download the update-used software to the buffer memory 206 efficiently and securely. Subsequently, under the control of the update-software 203, the CPU 201 securely updates the corresponding parts in the present control-software 204 that is halted with the update-used software stored in the buffer memory 206.

Figure 3:
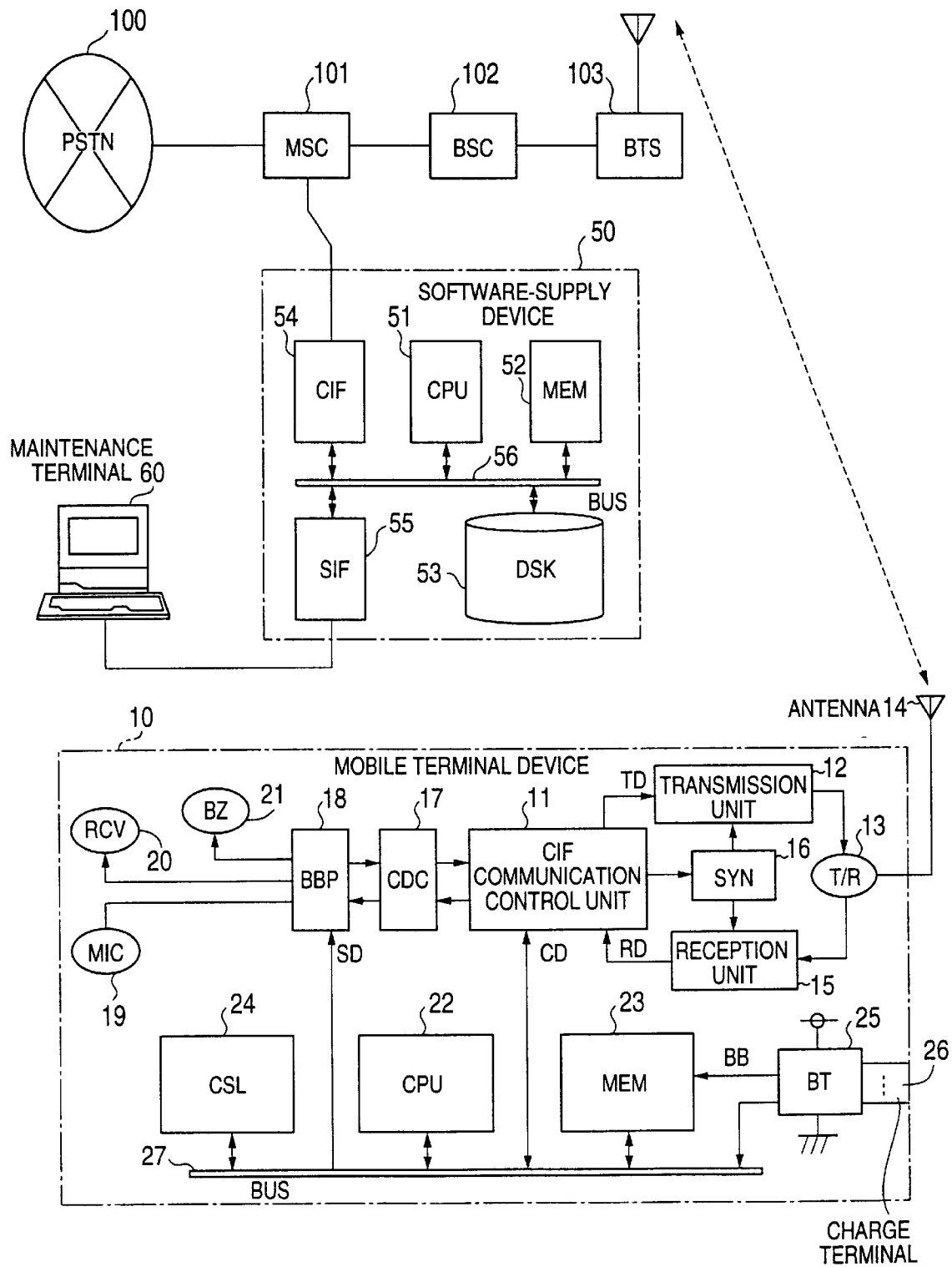
FIG. 3 is a diagram showing a structure of a mobile terminal system in an embodiment of the present invention.

FIG. 3 is a diagram of a mobile communication system in an embodiment of the present invention. In FIG. 3, the mobile communication system includes a public switched telephone network (PSTN) 100, a mobile switch control station (MSC) 101, a base station control device (BSC) 102, a base telephone station (BTS) 103, a software-supply device 50, a maintenance terminal 60, and a mobile terminal device 10 such as a radio terminal device, a cellular phone or the like.

The software-supply device 50 includes a CPU 51, a main memory (MEM) 52, a disk device (DSK) 53, a communication control interface (CIF) 54, a serial interface (SIF) 55, and a common bus 56 for the CPU 51. The CPU 51 is involved in main control of the software-supply device 50 including a call control, managing storage of every version of control-software, deciding whether download is necessary and controlling the download. The main memory (MEM) 52 stores application programs and data executed by the CPU 51. The disk device (DSK) 53 stores every version of control-software, the version information of control-software and the like. The serial interface (SIF) 55 is connected to the maintenance terminal 60.

The mobile terminal device 10 includes a communication control interface (CIF) 11 such as a TDMA system or the like, a transmission unit 12, a transmit-receive switch (T/R) 13, an antenna 14, a reception unit 15, a frequency synthesizer (SYN) 16, a CODEC 17, a base-band process unit (BBP) 18, a microphone (MIC) 19, a receiver (RCV) 20, a sound source (BZ) 21, a CPU 22, a main memory 23, a console control desk (CSL) 24, a rechargeable battery unit (BT) 25, a charge terminal 26, and a common bus 27 for the CPU 22. The CODEC 17 converts coded sound data into PCM data, and vice versa. The base-band process unit (BBP) 18 converts PCM data into sound signals, and vice versa. The sound source (BZ) 21 is, for example, a buzzer. The CPU 22 is involved in main control of the mobile terminal device 10 including a call control, key operations, and downloading of control-software and updating the control-software. The main memory 23 includes a RAM, a mask ROM, a flash ROM and the like, and stores application programs and data executed by the CPU 22. The console control desk (CSL) 24 includes a liquid crystal display, a dial key and the like. The rechargeable battery unit (BT) 25 serves as a power source, and is connected to the charge terminal 26.

The software-supply device 50 is connected to a network or installed in the mobile switch control station 101 or the like. The software-supply device 50 stores and manages every version of control-software of the mobile terminal device 10, and decides whether the control-software in the terminal device 10 should be updated in response to a request for a control-software version comparison from the terminal device 10. If it is determined that the control-software should be updated, the software-supply device 50 downloads the corresponding update-used software to the terminal device 10 through the base station 103. New control-software can be supplied to the software-supply device 50 through, for example, the maintenance terminal 60.

After powering the mobile terminal device 10, the CPU 22 registers the position of the terminal device 10 through the communication control unit 11 to the nearest base station 103, and the terminal device 10 stays in a waiting state. During the waiting state, the CPU 22 sends out sound data SD of a ringing to the BBP 18 when the mobile terminal device 10 receives a call, and the buzzer 21 rings. A user can make a call during the waiting state when the user dials the other party's dial number, the CPU 22 sends a call to the base station 103 in accordance with a given call set-up procedure, so that the terminal device 10 is connected to the other party. This call control of the CPU 22 and software download control that will be described later are done by managing control data CD between the CPU 22 and the communication control unit 11.

The sound signal from the microphone 19 during speech communication is formatted through the BBP 18, the CDC 17 and the communication control unit 11 to the transmission data TD, and is transmitted through the transmission unit 12 and the antenna 14 to the base station 103. The received signal from the base station 103 is formatted through the reception unit 15 to the reception data RD. Furthermore, the reception data RD is formatted through the communication control unit 11, the CDC 17 and the BBP 18 to the sound signal, and is outputted from the receiver 20.

The CPU 22 can inquire of the software-supply device 50 whether the version of the control-software in the mobile terminal device 10 is the latest by utilizing the waiting state by calling the software-supply device 50 voluntarily. If the control-software version is not the latest one, update-used software is downloaded from the software-supply device 50 in order to step up to the latest version of the control-software. In this way, the mobile terminal device 10 can always maintain its control-software to the latest version.

The mobile terminal device 10 does not need prior information about a revision of the control-software version, for example, the latest software version because the device 10 has the structure to report its control-software information to the software-supply device 50 at regular time intervals. Consequently, the mobile terminal device 10 does not need to have another software-version management system therein, and is able to maintain its control-software version to the latest one with a simple control.

A detailed description will now be given of the software downloading and updating methods, with reference to the accompanying drawings.

Figure 4A:
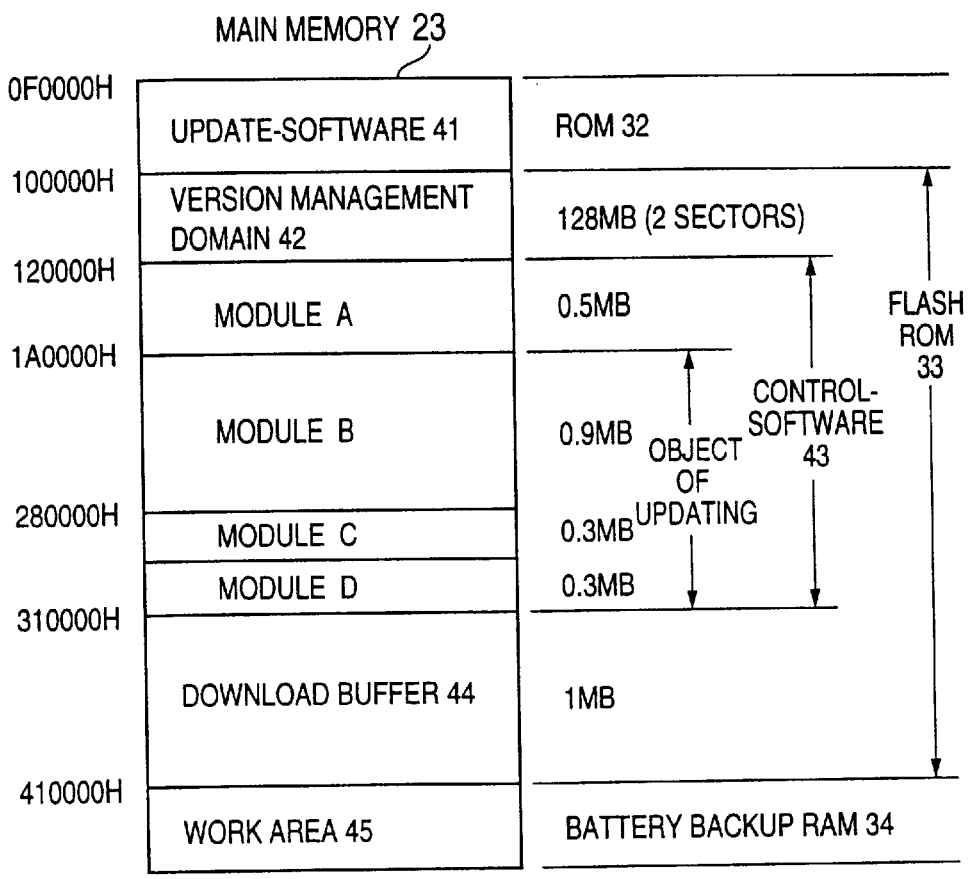
FIGS. 4A and 4B are diagrams showing a memory map of the mobile terminal system in an embodiment of the present invention.

FIGS. 4A–4B, 5 and 6 describe a memory map of the mobile terminal device 10 in an embodiment of the present invention. FIG. 4A shows a memory space of the main memory 23. This memory space includes a mask ROM 32, a flash ROM (or a EEPROM) 33 and a battery backup RAM 34. Software and data are stored in the corresponding above-described memory.

Memory address of the software storage is fixed with the structure of the CPU 22 and a limitation of OS generally. Accordingly, the head address of every software module is also fixed. Many existing small devices such as a cellular phone have the above-described limitation, and the system shown in FIG. 4A is not an exception. Addresses in the CPU 22 are expressed in 32 bits.

Figure 9:
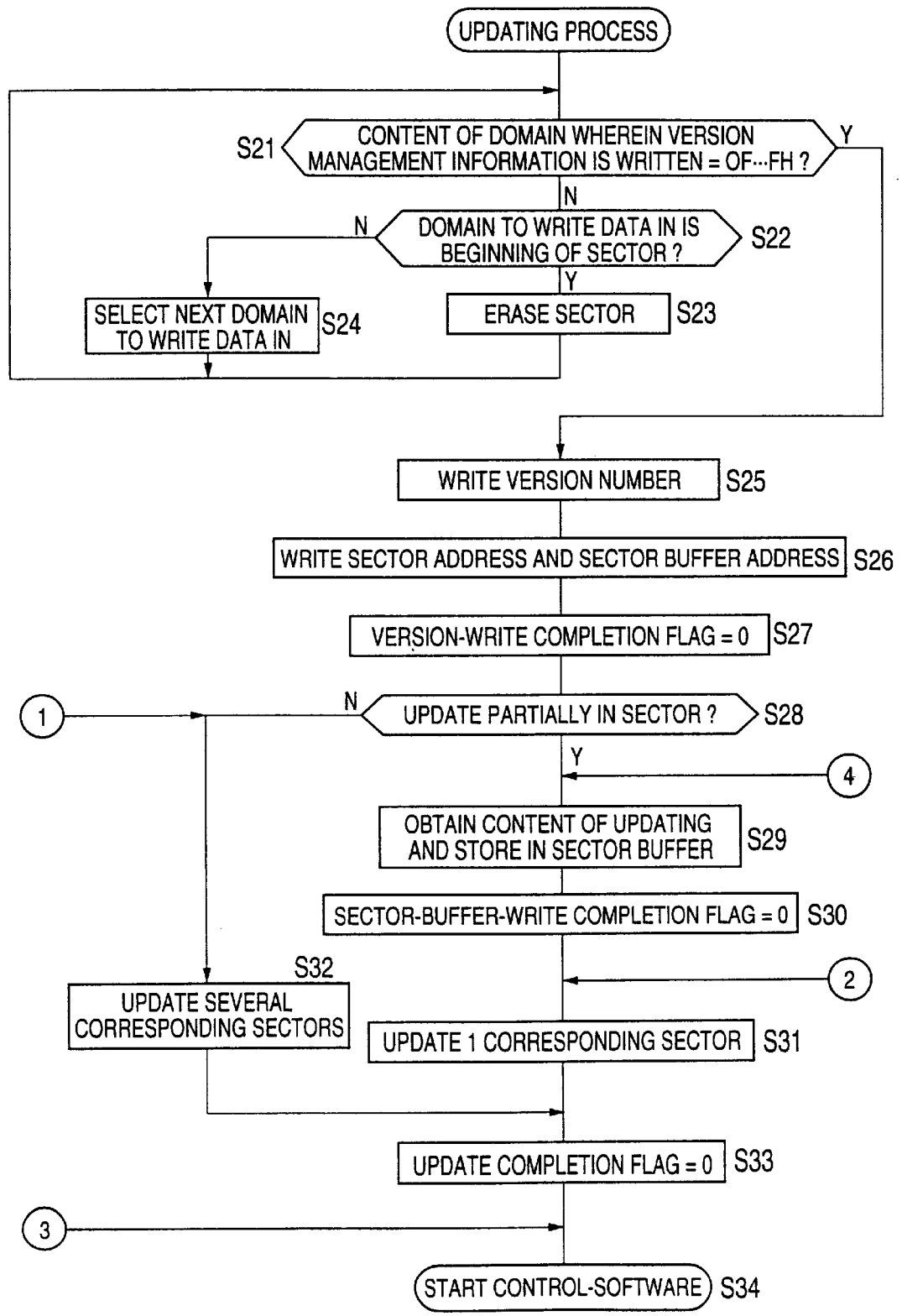
FIG. 9 is a flowchart showing an updating process in an embodiment of the present invention.
Figure 10:
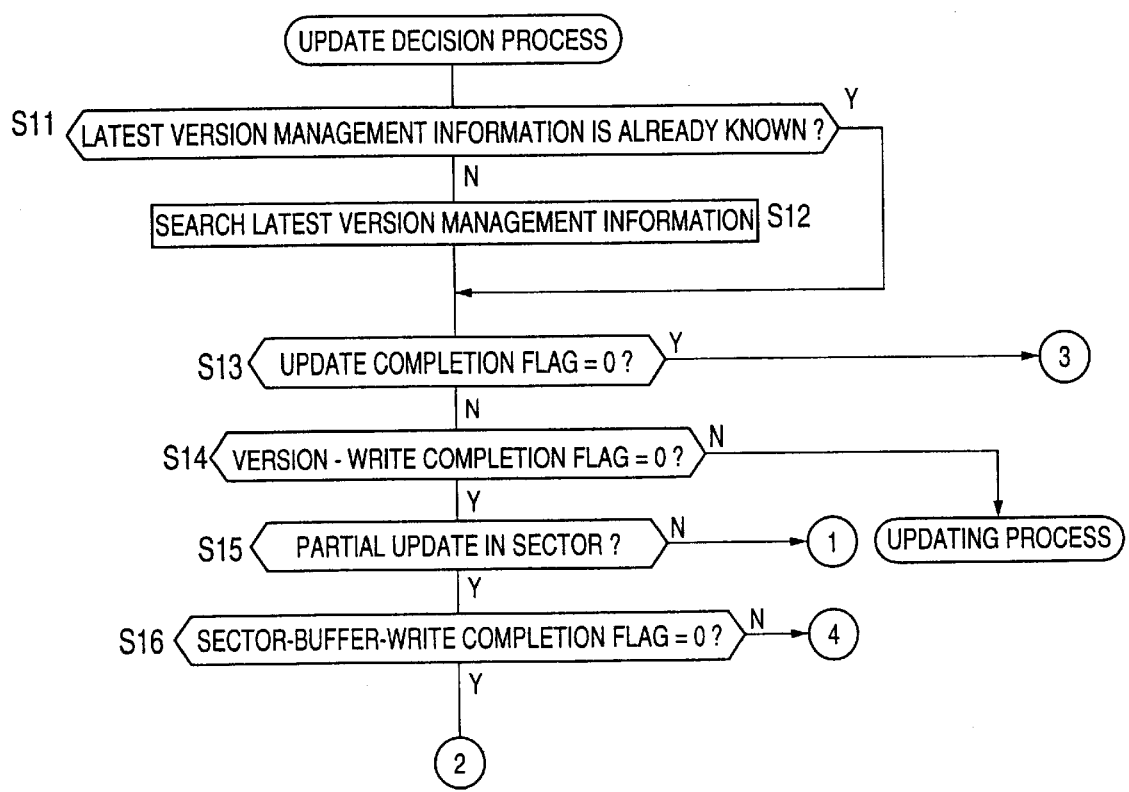
FIG. 10 is a flowchart showing an update decision process in an embodiment of the present invention.

An update-software 41 takes an update process in FIG. 9 and an update decision process in FIG. 10, and is stored in the mask ROM 32 because it is unnecessary to be updated or modified. The update-software 41 includes a function to update a control-software 43 that is described later by rewriting the control-software 43, and updates the control-software 43 only when the control-software 43 is halted.

A version management domain 42 is rewritable of management information of the control-software version and has to maintain its contents even when the mobile terminal device 10 is powered off. Accordingly, the version management domain 42 is located in the flash ROM 33. To rewrite the contents of the flash ROM 33, it is necessary to erase data in the flash ROM 33 before writing data in. Data-write operation can be done in each byte. However, data-erase operation has to be done in each sector. Accordingly, the data-rewrite operation of the version management domain 42 and the later-described control-software 43 is done physically in each sector. In this example of the flash ROM 33, the entire bits in an erased sector become "1", and the corresponding bit to written data becomes "0".

In the flash ROM 33, each module of the version management domain 42 and the later-described control-software 43 are preferably located at the beginning of a sector so that data in the domain 42 and the control-software 43 can be rewritten easily. In an embodiment of the present invention, the flash ROM 33 with a sector size of 64 KB is used, and an interval between head addresses of each sector is set to 10000H (64 KB) starting from the address 100000H.

The control-software 43 of the mobile terminal device 10 is stored in the flash ROM 33 so that the control-software 43 is updateable and is possible to maintain its contents even when the mobile terminal device 10 is powered off. For reducing the size and the cost of the mobile terminal device 10, memory capacity of the flash ROM 33 should rather be small. Therefore, in an embodiment of the present invention, the increase in the memory capacity of the flash ROM 33 involved in the software update is minimized by utilizing the storage domain of the control-software 43, particularly by rewriting, erasing data in each sector and writing data over the sector in the storage domain of the flash ROM 33.

The control-software 43 includes software modules A, B, C and D. The module A takes part in a fixed process unlike communication service, and is not to be updated. The module B takes part mainly in a communication control process such as a call control, and is to be updated since the module B relates to update, addition and improvement of the communication service. The modules C and D take part mainly in a key control process and other service functions, and are to be updated. Since a program size of the control-software 43 changes generally as the software 43 is updated, the head address of each module A, B, C and D has been fixed when the control-software 43 is designed, including an empty memory space for a case that the program size of each modules A, B, C and D is increased.

New control-software is downloaded under the control of the present control-software. Each of the above-described practically interrelated modules A, B, C and D is indispensable to build a necessary radio communication function to download the new control-software. Under the above-described circumstance, the control-software 43 is updated basically in each module. Furthermore, a partial update in a module is possible for lowering communication traffic while downloading the modules. A new module B should be created so that the control-software 43 can properly work in a situation that the new module B is combined with the module A and either new or old modules C and D.

A download buffer 44 temporarily stores a newly downloaded control-software such as update-used software from the software-supply device 50. While rewriting the present control-software 43 using contents of the download buffer 44, the control-software 43 becomes unable to operate again if the contents of the buffer 44 are lost. In the case that the present control-software is unable to operate, it becomes also impossible to re-download the update-used software using the control-software function. Considering the above-described fact, the flash ROM 33 is used for the download buffer 44.

The size of the download buffer 44 is chosen to be as smaller than the control-software 43 as possible in order not to increase a memory size of the terminal device 10. In an embodiment of the present invention, considering a case that the largest module B is rewritten at once, the size of the download buffer 44 is chosen to be larger than the size of the module B. In the example of the figure, the size of the download buffer 44 is 1 MB that is half the size of the control-software 43. The size of the download buffer 44 can be still smaller by increasing the number of modules and decreasing the size of each module. Therefore, it is possible to control the increase in the capacity of the flash ROM 33 in an attempt to miniaturize the size and to minimize the cost of the mobile terminal device 10.

Accordingly, a memory size of the download buffer 44 should be the size only enough to store the update-used software used for updating necessary parts in the control-software 43. The control-software 43 may be updated either by updating each separated module in the control-software 43 or by applying a patch that rewrites a byte or a bit. However, if the memory size of the download buffer 44 and that of the control-software 43 are equal, the download buffer 44 does not save its memory size. According to the present invention, it is possible to flexibly trade off between the size of the update-used software and the size of the mobile terminal device, its price, and its downloading time.

Information about the address of the latest version-management information in the version-management domain 42 is stored in a work area 45 made of the battery backup RAM 34 for its access convenience. In a case that the memory is lost resulting from the shortage of energy remaining in the backup battery cell, it is possible to search the latest version-management information directly in the version-management domain 42 through a process described below.

Figure 4B:
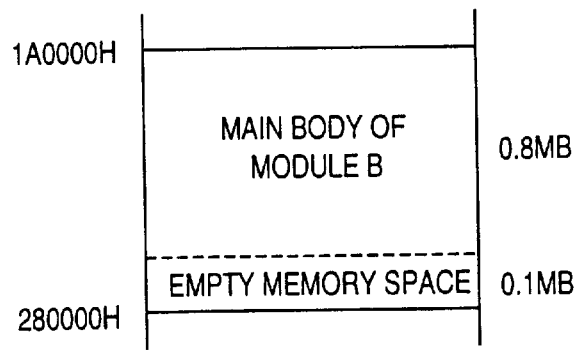

FIG. 4B shows how data is stored in the module B. The memory area 0.9 MB of the module B includes programs equal to 0.8 MB as a main body of the module B and an empty area of 0.1 MB. For the case that the main body of the updated module B exceeds the maximum memory area of 0.9 MB, the memory area is adjustable in itself by updating the following module C or the like simultaneously with the module B.

Figure 5:
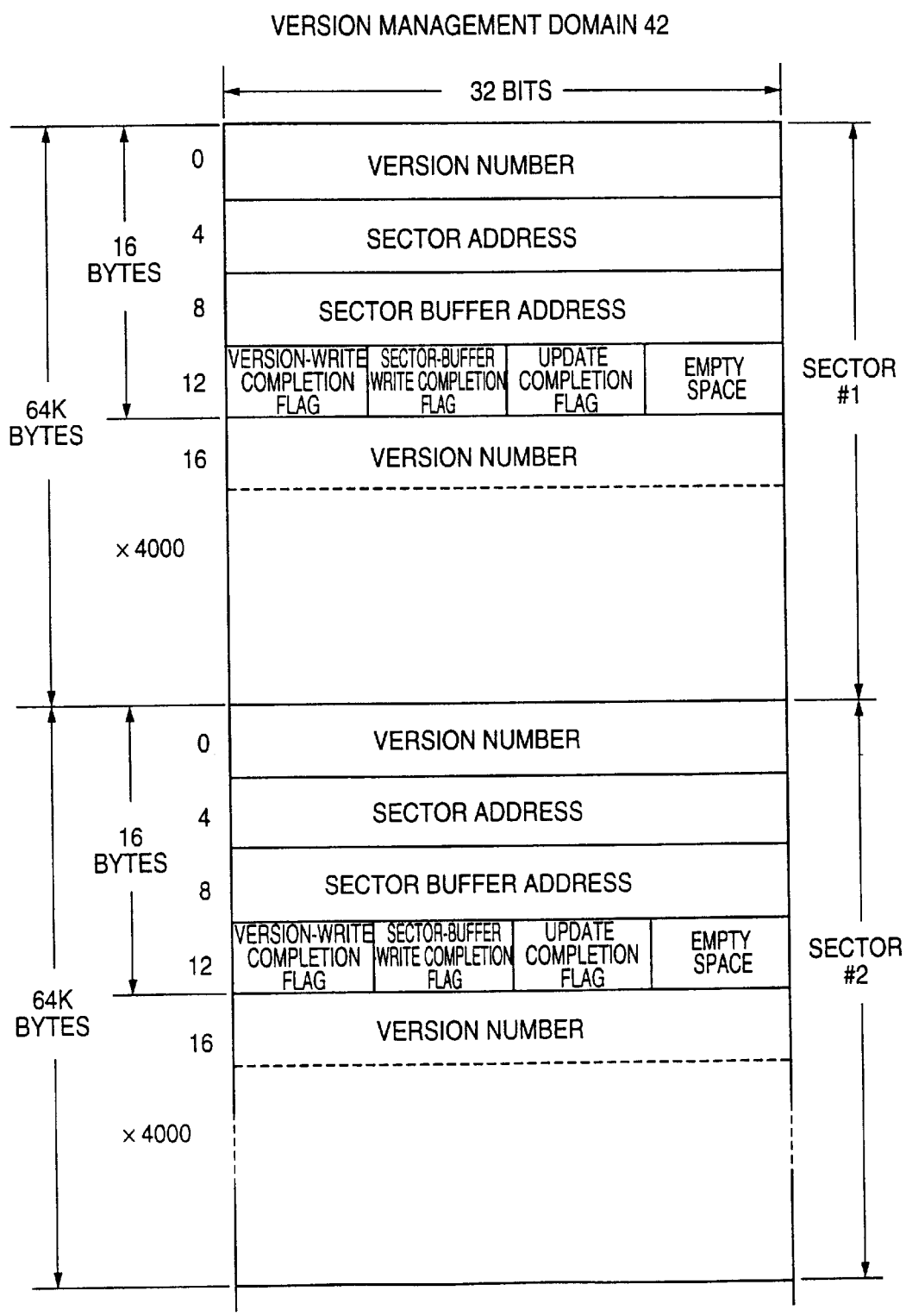
FIG. 5 is a diagram showing a memory map of the mobile terminal system in an embodiment of the present invention.

FIG. 5 shows a memory format of the version management domain 42. The version management domain 42 has two sectors in order to manage the version management information efficiently in the flash ROM 33. Each piece of the version-management information is recorded in a domain of 16 bytes. New version-management information is added to the following 16 bytes domain at each update. After a sector is filled with the information, new information is recorded from the head of the other sector. If the other sector has been used up in the past, the content of the sector are erased before writing information data in the sector.

A version number is managed with a 32-bit integer, and a greater version number indicates a later version of software. In an embodiment of the present invention, the version number 0FFFFFFFFH is invalid so as not to be confused with a case that the contents of the flash ROM 33 are erased and each bit is set equal to "1". A 32-bit version number has more than four billion patterns to distinguish the updates, which is almost infinite considering the life of the mobile terminal device 10 and the number of possible rewriting operations to the flash ROM 33 that is about a hundred thousand.

The version number basically represents a version of the entire control-software 43 not of a single module so as to prevent an unsatisfied condition caused by a combination of different module versions. In a case that the control-software 43 is updated sequentially in each module, the version number of the entire control-software is updated at each module update.

In addition to the above-described version number, a sector address of the control-software 43 to be updated in the control-software storage domain and a address of a later described sector buffer 44a that stores the update-used software for partial updating in a sector. Therefore, a partial update operation can be re-processed in the sector even if the partial update operation is previously failed. The sector address and the sector buffer address are set to the same address for a case that the sector is not partially updated. If the sector is to be partially updated, these addresses are not the same.

Additionally, a version-write completion flag indicates whether the above-described version-management information has been written into the version-management domain 42. A sector-buffer-write completion flag indicates whether the update-used software for partial updating has been written into the sector buffer 44a. An update completion flag indicates whether the update of the section to be updated is completed. Detailed descriptions of the above three flags will be given below.

Figure 6:
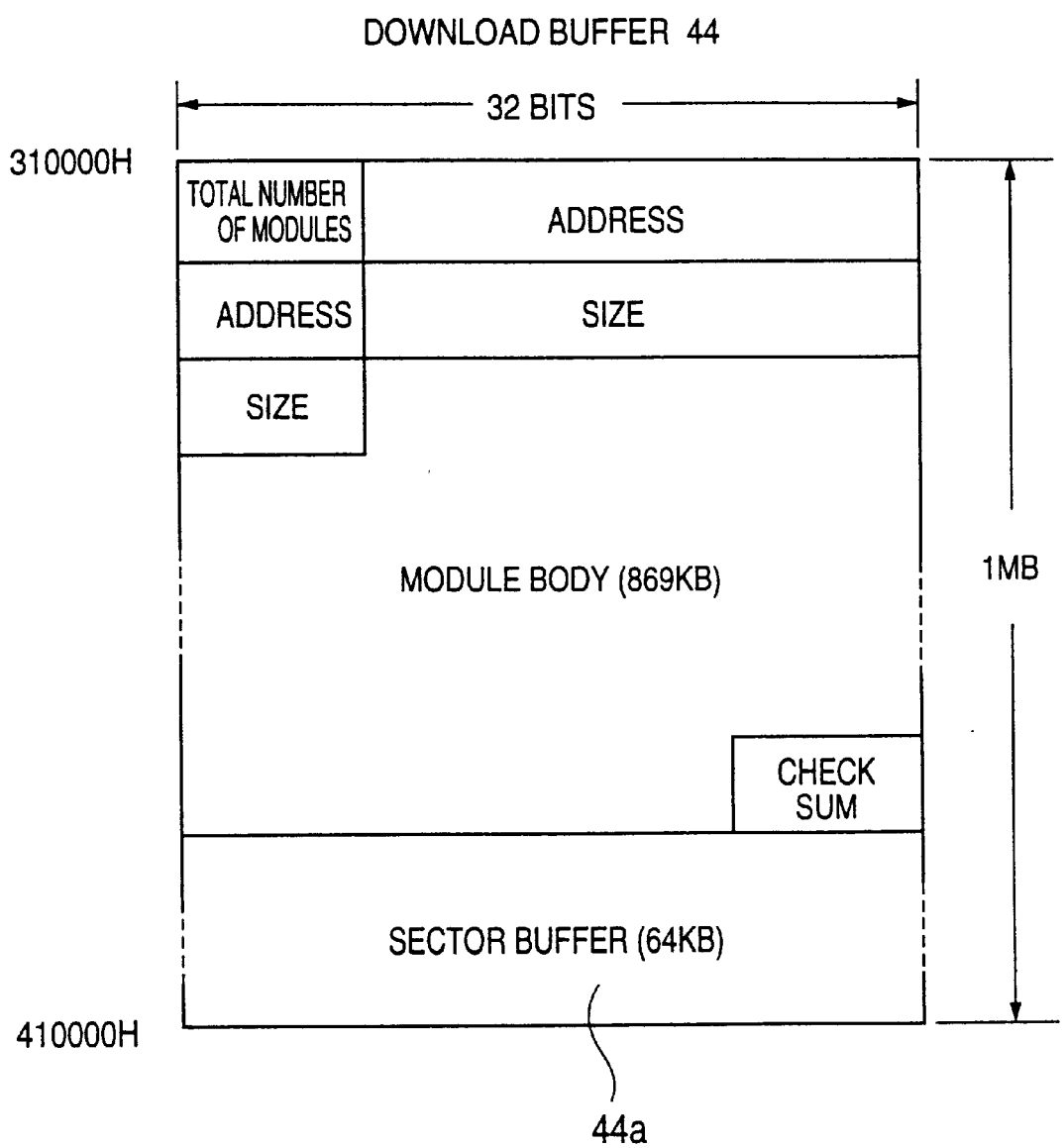
FIG. 6 is a diagram showing a memory map of the mobile terminal system in an embodiment of the present invention.

FIG. 6 shows a memory format of the download buffer 44. In FIG. 6, "total number of modules" shows the total number of modules to be updated. For instance, "total number of modules" becomes "1" if a single module B is to be updated, "2" if the multiple modules C and D are to be updated simultaneously, and so forth. "Module body" stores a module body of the update-used software, and provides a memory space capable of storing the update-used software at least the size of the largest module B. "Address" shows an address of the memory space in the control-software storage domain 43 wherein a downloaded module body is to be stored. "Size" shows the size of the module body currently to be downloaded. "Check sum" stores the result of adding every data by a byte from the beginning of "total number of modules" to the end of "module body". It should be noted that an overflow of addition is ignored. Every information besides the above-described "module body" is attached to a transmission block when the block is formatted by the software-supply device 50 at the time of downloading the block to the download buffer 44 of the mobile terminal device 10. A data format of the transmission block is described later along with FIG. 11.

A plurality of update-used software can be packed in the download buffer 44 for updating a single module. In this case, each update-used software is packed in order, for instance, "address 1", "size 1", "update-used software body 1", "address 2", "size 2", "update-used software body 2", and so forth. The CPU 22 individually updates software that are spread in the control-software storage domain 43 based on the information such as "address 1", "address 2" or the like. Consequently, update of the control-software over a wide area can be done efficiently with less information.

A "sector buffer" 44a is a buffer domain which size is 64 KB, and is used for updating a sector partially and safely in the case that the control-software module is updated partially. The total size of the download buffer 44 is the addition of 896 KB of the module body, 10 B of the management domain, and 64 KB of the sector buffer. By rounding off a sector unit 64 KB to the next sector, the total size of the download buffer 44 becomes 1 MB.

Figure 7:
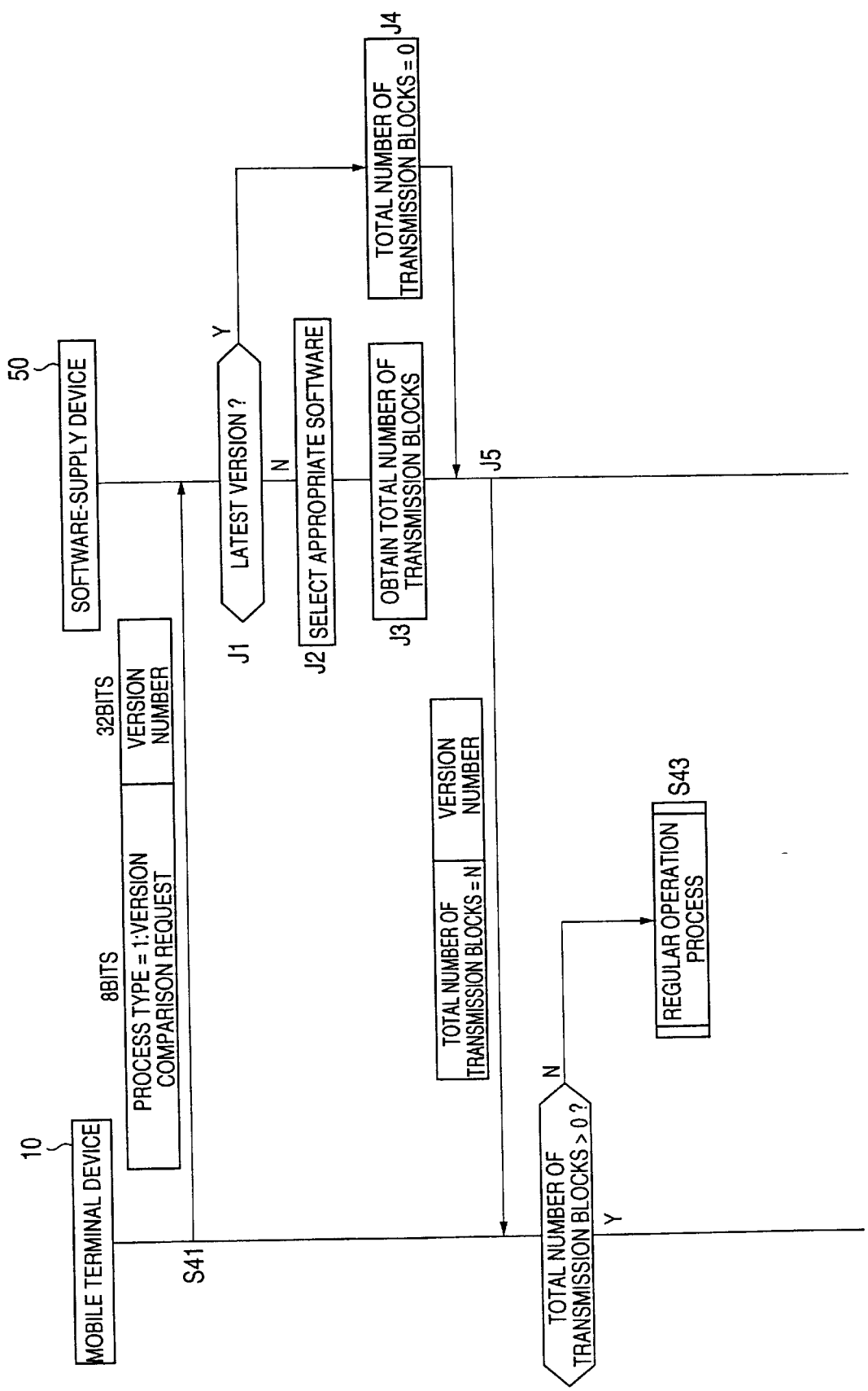
FIG. 7 is a flowchart showing a downloading process in an embodiment of the present invention.
Figure 8:
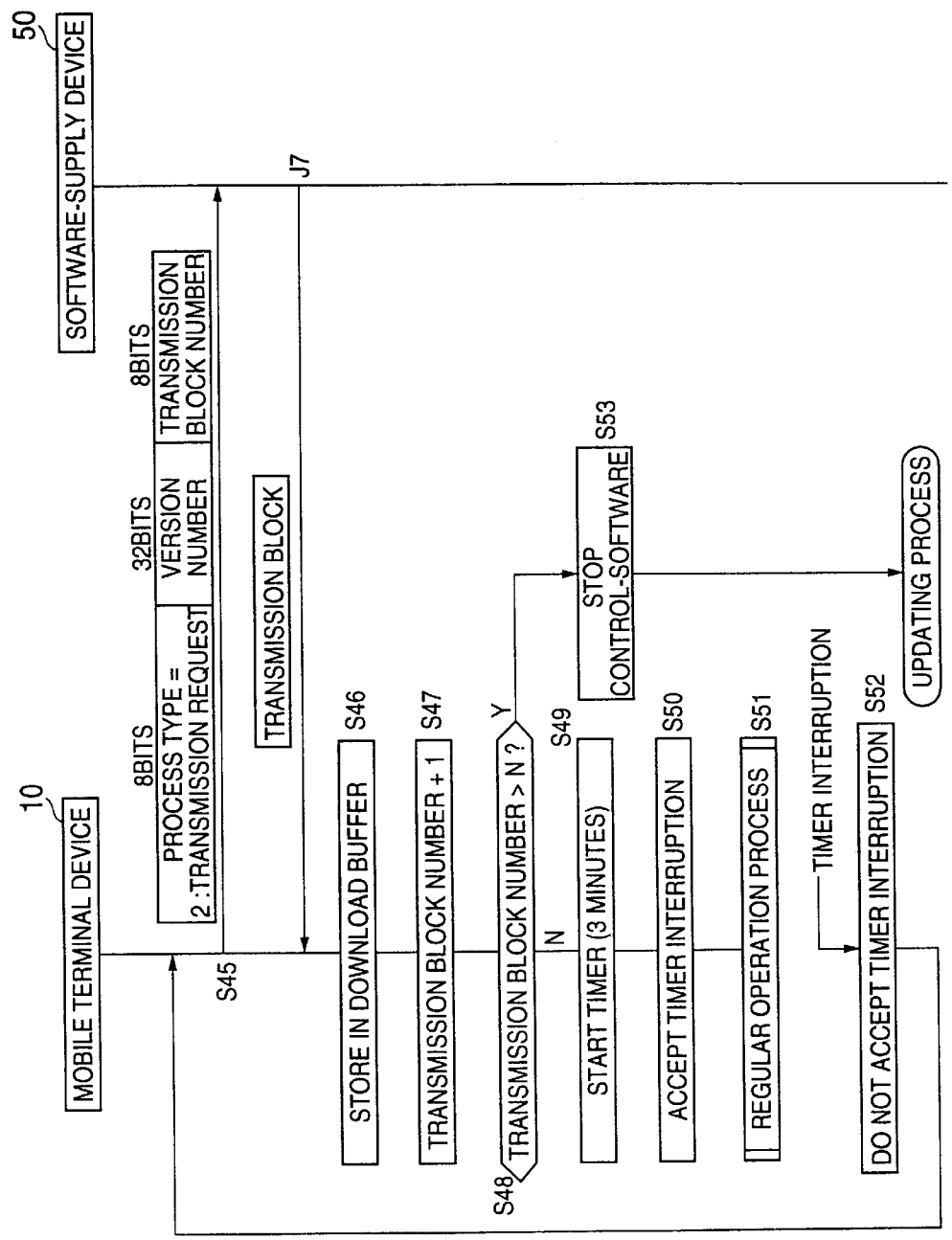
FIG. 8 is a flowchart showing a downloading process in an embodiment of the present invention.

FIGS. 7 and 8 are respectively a flowchart 1 and a flowchart 2 describing a download process in an embodiment of the present invention. In FIG. 7, the software-supply device 50 determines whether the control-software 43 should be updated after the device 50 receives the present control-software version of the mobile terminal device 10 from the device 10. The update of the control-software is preferably done in a condition that a battery cell in well charged in the device 10 and the device 10 is not being used or in the waiting state. In an embodiment of the present invention, the mobile terminal device 10 starts inquiring for update-used software to the software-supply device 50 when the device 10 is connected to a charger outside the device 10 and is not used for more than a fixed time, for example, 1 hour. Additionally, the rechargeable battery cell unit 25 detects a condition that the mobile terminal device 10 is connected to the charger, and the CPU 22 detects the condition through the bus 27. More particularly, the rechargeable batter cell unit 25 detects a condition that the mobile terminal device 10 is not being used for more than the fixed time by checking a condition that no key operation including the key operations for a call reception is done.

After the above-described condition is filled, the CPU 22 automatically calls the software-supply device 50 at first through the control-software 43. This call may be a special number call to a communication service provided by a network or a regular call to the software-supply device 50 setting the software-supply device as a receiver. When the call is connected, the inquiry from the mobile terminal device 10 is inputted to a step S41 process. At the step S41, the CPU 22 transmits "process type=1: a version comparison request" and "version number" to the software-supply device 50. "Version number" is a version number of the present control-software 43 in the mobile terminal device.

At a step J1, after receiving the version comparison request from the mobile terminal device 10, the software-supply device 50 determines whether the received version number of the control-software 43 in the device 10 is the latest version number managed by a mobile communication system. If the received version number is not the latest, at a step J2, the latest version of the control-software 43 or appropriate update-used software modules that modifies the control-software 43 to the latest version is selected. At a step J3, the total number of the transmission blocks of the update-used software is obtained. The total number of the transmission blocks is set to "0" at a step J4 if the received version number is the latest at the above step J1. At a step J5, the total number of the transmission blocks=N is returned to the mobile terminal device 10. If N is not "0", a new control-software version number is returned to the device 10.

At a step S42, the CPU 22 of the mobile terminal device 10 determines whether the total number of the transmission blocks is greater than "0" after receiving the total number of the transmission blocks. If the total number of the transmission blocks is "0" indicating that the mobile terminal device 10 is controlled by the latest version of the control-software 43, the device 10 disconnects from the software-supply device 50 and executes its regular operation processes at a step S43. If the total number of the transmission blocks is greater than "0", downloading process of the update-used software starts at a step S45 of FIG. 8.

In FIG. 8, downloading of the update-used software is processed as follows. The mobile terminal device 10 requests for the transmission blocks to the software-supply device 50, and the device 50 transmits the transmission blocks to the device 10 for its response. At the step 45, the CPU 22 transmits "process type=2: transmission request", "version number" and "transmission block number" to the software-supply device 50. This transmission request includes the control-software version number that relates to the transmission request and a later-described transmission block number so that the software-supply device 50 can execute the distinctive search for the specific transmission blocks therein easily and immediately. A series of numbers increasing one by one are given to the transmission blocks and are named transmission block numbers. The transmission block number of a first transmission block in each software version or update-used software module is set to "1".

The software-supply device 50 returns the transmission blocks that correspond to the transmission block numbers to the mobile terminal device 10 after receiving the transmission request from the device 10 at a step J7. At the step J7, the software-supply device 50 can select the transmission block instantly through a simple process, for instance, by locating and reading the corresponding transmission block from a management table with information of the version number and the transmission block number included as keys in the transmission request from the device 10.

Figure 11:
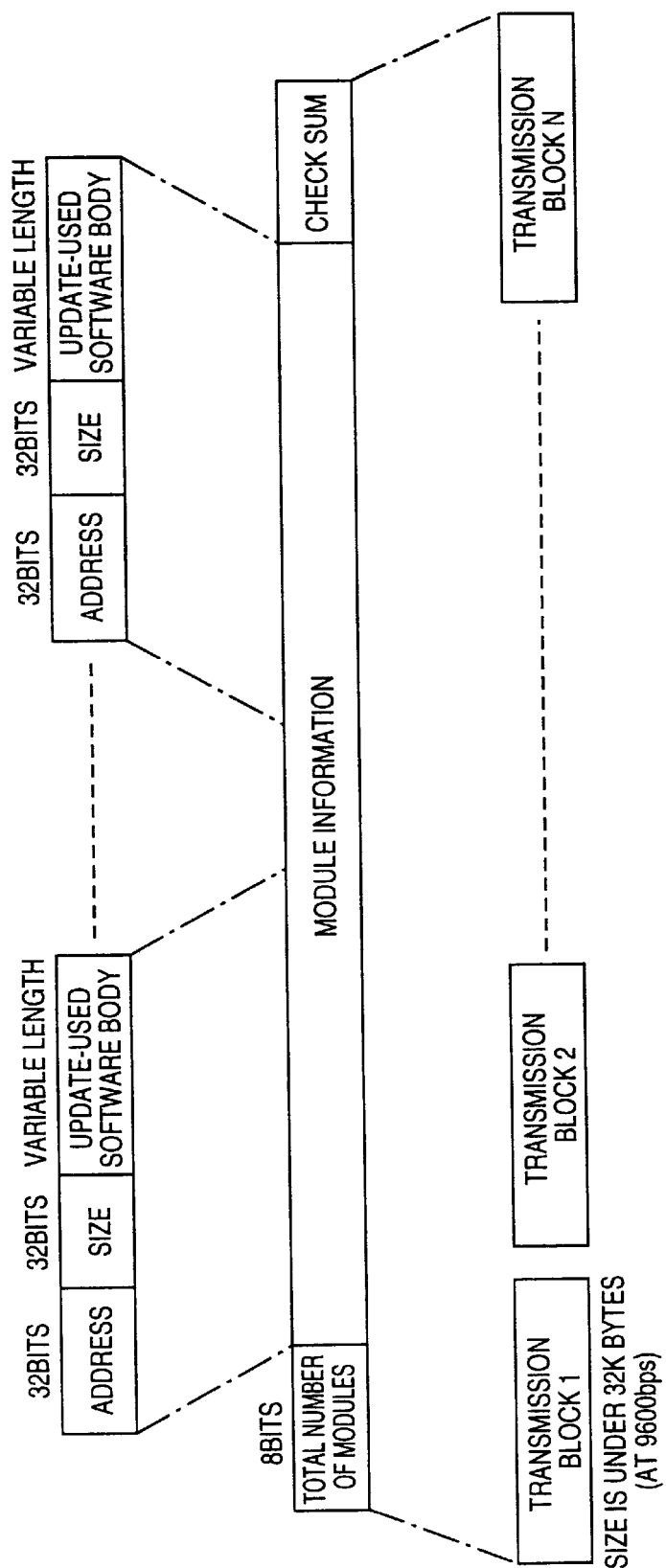
FIG. 11 is a diagram of a transmission block in an embodiment of the present invention.

FIG. 11 is a diagram showing an image of a transmission block in an embodiment of the present invention. For instance, to update the module B, the software-supply device 50 obtains one or more required update-use, software in advance, and expands to a column of "module information". This expanded information corresponds to each of the formatted information in the above-described download buffer 44. For each update-used software, "address", "size" and "update-used software body" are packed together. In addition, "total number of modules=1" is added at the beginning of the expanded information, and "check sum" acquired by adding "total number of modules" and "module information" is added at the end. Then, the information is divided into each of fixed sized transmission blocks corresponding to the transmission block numbers, and is stored momentarily in a memory, for example, the DSK 53. When the radio communication speed is 9,600 bps, the size of each transmission block is chosen to be under 32 KB so that the transmission time for each block is less than 30 seconds.

It is also possible to transmit a plurality of modules to the download buffer 44 simultaneously. For instance, consider a case that the modules C and D are to be transmitted simultaneously to the download buffer 44. "Total number of modules=2" is set. Information of "address", "size", and "update-used software body" are packed for each update-used software of the modules C and D into "module information".

Back in FIG. 8, at a step S46, the CPU 22 stores the transmission block into the download buffer 44 after receiving the transmission block from the software-supply device 50. At a step S47, "1" is added to the transmission block number. A step S48 compares whether the transmission block number is greater than the total number of transmission blocks N. If not, a timer that is set to, for instance, 3 minutes starts at a step S49. A step S50 accepts interruption of downloading the update-used software by expiring the timer. At a step S51, the CPU 22 processes regular operations in the present control-software 43 instead of downloading the update-used software. At the time, a call between the software-supply device 50 and the mobile terminal device 10 is disconnected or held, and the device 10 is back in the waiting state. During this waiting state, the mobile terminal device 10 can transmit or receive a call regularly. The timer is stopped and its number count is cleared if the device 10 transmits or receives a call.

After 3 minutes have passed in the waiting state, the above describe timer timeouts and the control proceeds to a step S52 by the timer interruption process. At the step S52, the interruption of the timer is not permitted and the mobile terminal device 10 recovers the disconnected or held call by reconnecting to the software-supply device 50. Subsequently the control shifts back to the step S45. After repeating the above-described process for downloading the update-used software, the software can be completely downloaded to the download buffer 44 if the transmission block number is greater than the total number of the transmission blocks N at the step S48. Then the control proceeds to a step S53. The call between the mobile terminal device 10 and the software-supply device 50 is disconnected and the currently operating control-software 43 is halted. The control of updating the control-software 43 proceeds to the update-software shown in FIG. 9.

FIG. 9 is a flowchart showing the update process in an embodiment of the present invention. At a step S21, the update-software 41 determines whether the content of a domain wherein new version management information is to be written is OF . . . FH. Additionally, the location of the latest version information in the version management domain 42 is stored in the work area 45 of the battery backup RAM 34. Since the location of the latest version is determined usually with the information stored in the work area 45, the update-software 41 selects the next 16 bytes domain to record the information. Then, the control proceeds to a step S25. However, in a case that the information is lost due to shortage of energy remaining in the backup battery cell or the previously written sector is reused for writing new version management information in, the content of the domain wherein new version management information is to be written is not OF . . . FH. In that case, the domain wherein the information is to be written has already been used and the control proceeds to a step S22. At the step S22, the update-software 41 determines whether the domain is the beginning of the sector. If so, the entire sector including the domain is erased at a step S23, and the control shifts back to the step S21. If the domain is not the beginning of the sector, the next domain wherein the information is to be written is selected at a step S24, and the control shifts back to the step S21.

When a new domain wherein the information is to be written is detected at the step S21, the downloaded control-software version number is written into the column of "version number" at a step S25. At a step S26, the sector address of the control-software storage domain 43 that is to be updated is written into the column of "sector address". In the case that the control-software is updated partially in its sector, the address of the update-used software for partial updating in the sector buffer 44*a* is written to the column of "sector buffer address". If the software is not to be partially updated, the content of "sector address" is written to the column of "sector buffer address". At a step S27, the version-write operation is completed and the version-write completion flag is set to "0".

At a step S28, the update-software 41 determines whether it updates the control-software partially in the sector. If the control-software is not to be partially updated, the update-software 41 rewrites the sectors that lie in sequence or are spread in the control-software with the corresponding module bodies stored in the download buffer 44. The update-software 41 rewrites the sectors in the control-software 43 by writing the corresponding update-used software over each sector after erasing the sector to be updated. Subsequently, the control shifts to a step S33.

In the case that the software is to be partially updated by the decision made at the step S28, the one sector sized content for updating is obtained and stored into the sector buffer 44*a*. To be concrete, being read from the sector that is the object of updating and is not yet updated, the control-software data is rewritten partially with the data for partial updating stored in the download buffer 44. Subsequently, the partially updated control-software data is written and stored into the sector buffer 44*a* at a step S29. The data transfer is preferably processed through the work area 45 of the battery backup RAM 34 so as to deal effectively with a condition that the power source in the device 10 is not supplied during the data rewrite process. At a step S30, the sector-buffer-write operation is completed and the sector-buffer-write completion flag is set to "0". At a step S31, the content of the sector that is to be updated is rewritten with the content of the sector buffer 44*a*. At a step S33, the update of the control-software is completed and the update completion flag is set to "0". Finally at a step S34, the updated control-software starts up.

Each corresponding completion flag is set at the completion of each step in the software update process in this manner so as to be in precise control of the location of the update-used software either in the control-software storage domain 43 or in the download buffer 44.

If any error is detected physically in the series of the update process, for instance, writing or erasing the contents of the flash ROM 33, the console unit 24 displays a message describing necessity of a repair of the mobile terminal device 10, and the update process is discontinued.

Additionally, after the completion of each downloading of the update-used software and each update of the control-software 43, the update-software 41 searches for data error with use of "check sum". If any data error is detected, the control-software 43 retries downloading the update-used software, and the update-software 41 retries updating the control-software 43 so as to minimize accidents during the control-software update process.

The above-described process is the downloading and updating process in which data is possible to be stored and fit in the download buffer 44. The entire control-software 43 may not be updated to the latest through one update process because of the size limitation of the download buffer 44. In other words, there is a case that the mobile terminal device 10 with the control-software 43 has to go though several module update processes in order to update the control-software 43 to the latest version. In such the above case, the mobile terminal device 10 can efficiently update its entire control-software 43 which size is over the size of the download buffer 44 by repeating the above described downloading and updating processes.

For instance, the mobile terminal device 10 can re-update its latest control-software 43 immediately by proceeding to the version comparison request process at the step S41 after completing its control-software updating process when several updating processes of the control-software 43 is necessary as described above or the latest version of the control-software 43 is again renewed to the further version during the downloading of the latest control-software 43. For such the case, the control-software 43 is designed to process the version comparison request immediately after the software 43 is updated. The battery backup RAM 34 records information whether the control-software 43 is just updated or not. In a case that content of the battery backup RAM 34 is lost, the mobile terminal device 10 starts regular operation processes instead of processing the version comparison request. The mobile terminal device 10 operates regularly without hindrance even if the updating operation of its control-software 43 is delayed.

FIG. 10 is a flowchart showing the update decision process in an embodiment of the present invention. In an embodiment of the present invention, any controls of the mobile terminal device 10 are not allowed during the update process of the control-software 43. However, the interruption of the update process caused by the shortage of energy remaining in the backup battery cell or a removal of the battery cell cannot be avoided. Accordingly, when the power source of the mobile terminal device 10 is turned on and before the control-software 43 starts operating, the update decision process has to be completed to determine whether the updated control-software 43 functions properly and whether the update operation of the control-software 43 is not under its process.

A step S11 determines whether the latest version management information has already been known. The location of the latest version management information is recorded in the work area 45 of the battery backup RAM 34. The location information usually exists there so that the decision at the step S11 is that the latest version management information has already been known. In such a case that the location information is lost due to the shortage of energy remaining in the backup battery cell, a step S12 searches the latest version management information.

In order to locate the latest version management information in the sectors, the version number of each first domain of the two sectors that store the version management information is checked. If either of the version number of the first domains of the two sectors is clear and is OFFFFFFFFH, the latest version management information must exist in the other sector. If both of the version numbers are not OFFFFFFFFH, the latest version management information must exist in the sector with the version number of the first domain greater than the version number of the first domain in the other sector. After the sector to be searched is specified, searching the version number of each 16 bytes domain in the sector retrieves the latest version management information. If the search reaches the final domain of the sector, the content of the final domain is the latest version management information. If OFFFFFFFFH is found before the search reaches the final domain, the domain before the domain with OFFFFFFFFH has the latest version management information therein.

A step S13 determines whether the updating operation of the control-software is completed and the update completion flag is "0". If the updating operation of the control-software is completed, the control-software starts operating at the step S34 of FIG. 9. If the updating operation of the control-software is not completed, a step S14 determines whether the latest version of the control-software is written to the version-write domain and the version-write completion flag is "0". If the latest version is not yet written, the control shifts to the updating process at the step S21 of FIG. 9. Since the above-described latest version management domain in the work area 45 has already been known, the control may shifts to the step S25 instead of to the step S21. If the version-write operation is completed, additionally, a step S15 determines whether the sector is to be partially updated.

Since the version-write operation has been already completed, the decision at the step S15 is made by comparing the information in the columns of "sector address" and "sector buffer address". If the sector address and the sector buffer address are the same, the sector is not to be partially updated and the control shifts to the step S32 of FIG. 9. Then the several sectors in the control-software as objects of updating are rewritten with the update-used software. If the sector address and the sector buffer address are not the same, the sector is to be partially updated, and the control proceeds to a step S16 that determines whether the sector-buffer-write operation is completed and the sector-buffer-write completion flag is "0". If the sector-buffer-write operation is not completed, the control shifts to the step S29 of FIG. 9 and the content for updating is obtained and stored into the sector buffer 44a. If the sector-buffer-write operation is completed, the control shifts to the step S31 of FIG. 9 and the sector that contains the object for updating is rewritten with the corresponding data in the sector buffer 44a.

Figure 12:
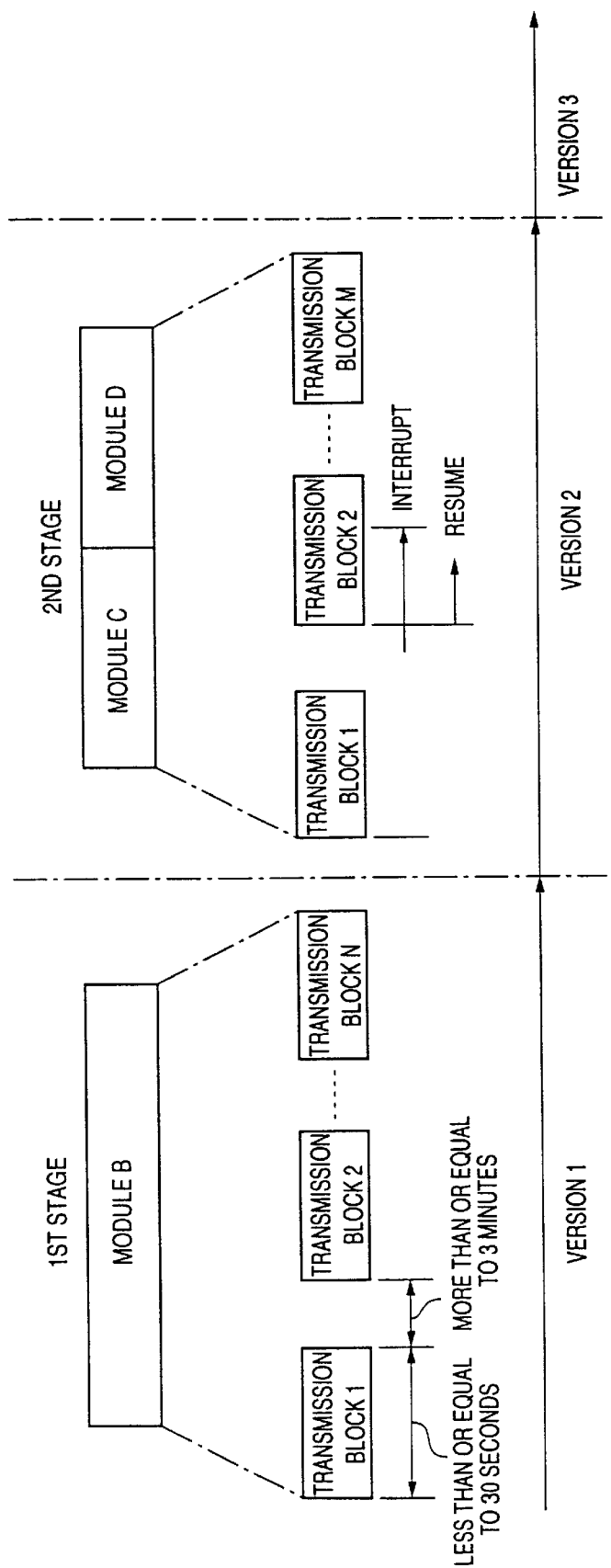
FIG. 12 is a diagram showing images of a downloading and an updating process in an embodiment of the present invention.
Figure 13:
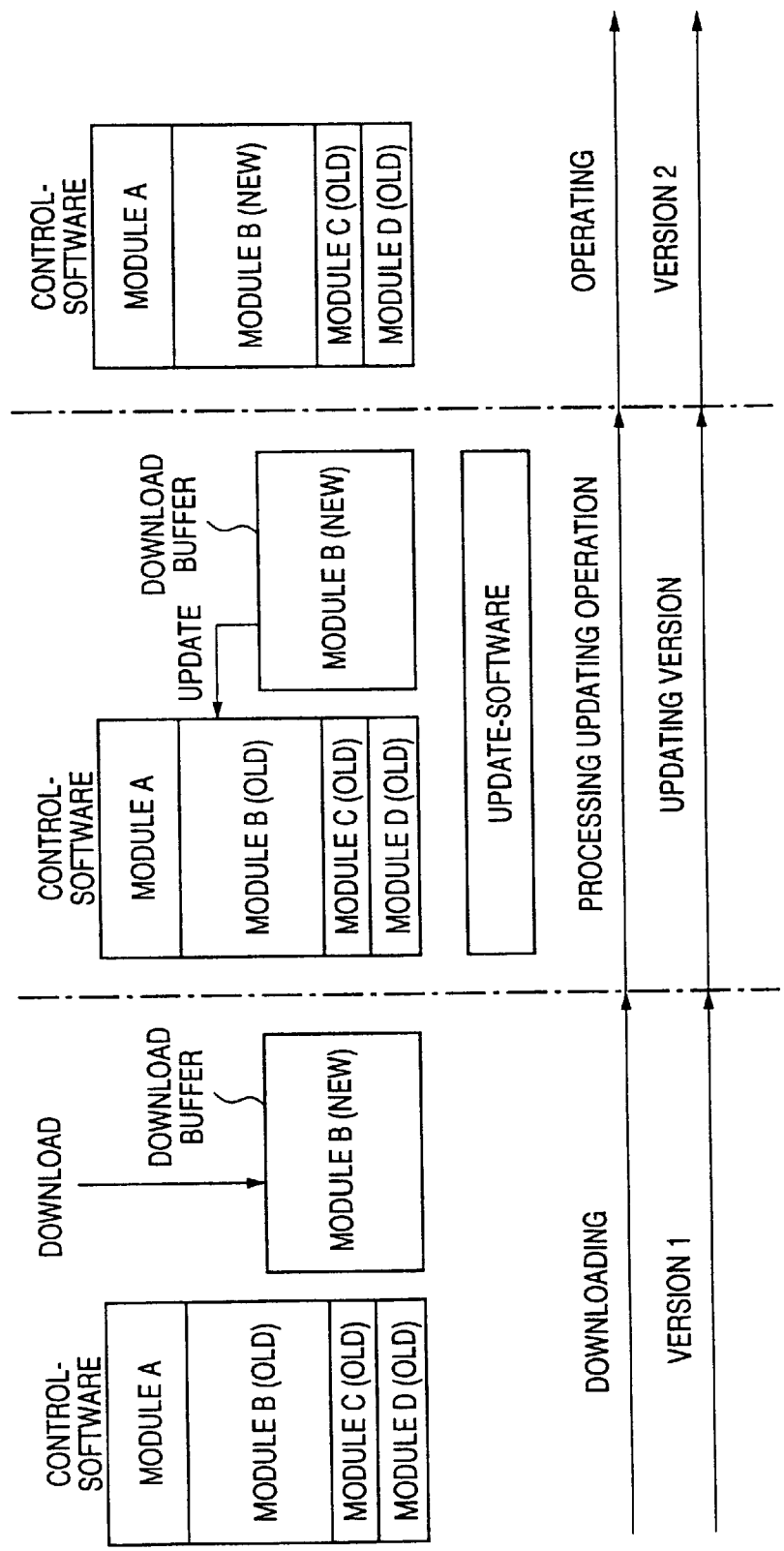
FIG. 13 is a diagram showing images of a downloading and an updating process in an embodiment of the present invention.
Figure 14:
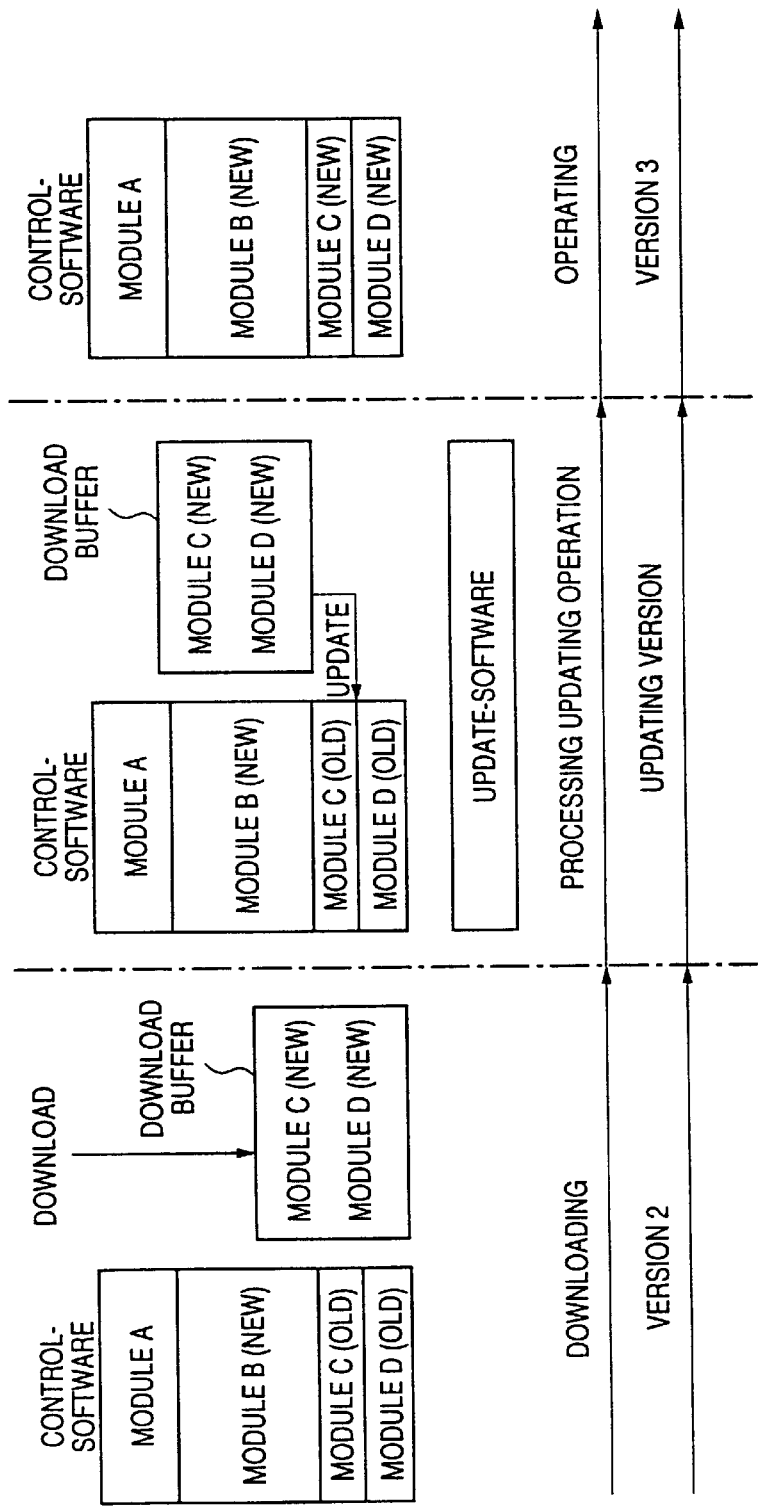
FIG. 14 is a diagram showing images of a downloading and an updating process in an embodiment of the present invention.

FIGS. 12, 13 and 14 are diagrams showing images of downloading and updating processes. FIG. 12 shows a timing chart in a case that the modules B, C and D are objects of updating. All the modules cannot be downloaded and updated simultaneously since the download buffer 44 has its size limitation. In this case shown in FIG. 12, the modules C and D are updated after the module B is updated. The version number of the control-software 43 is updated twice since the control-software updating operation is separated into two stages.

Required time for downloading data is proportional to the size of the data to be downloaded. Particularly in a case that the size of the object of downloading is large, the mobile terminal device 10 must be available for a long period of time. However, since this mobile terminal device 10 has only one communication channel, it cannot receive a call while connecting to the software-supply device 50. If a call is transmitted to the present device 10 that is connected to the software-supply device 50, the call line becomes busy. During downloading of the update-used software, the call line becomes also busy. Though the mobile terminal deice 10 cannot receive another call during its downloading operation, the device 10 can avoid the condition that a call receiving function is disabled continuously for a long time. For instance, a call can be received in a time interval, for example, 3 minutes created for processing regular operations after each transmission of data. If the mobile terminal device 10 receives a call between the intervals, the device 10 interrupts the downloading operation and postpones the following downloading operation of the transmission blocks.

A concrete time allocation shown in FIG. 12 is described below. For instance, the radio communication speed of this mobile terminal device 10 is set to 9,600 bps, and the size of a transmission block is set less than or equal to 32 KB so that each transmission block can be downloaded in less than 30 seconds. A time interval between the downloading operations is set more than or equal to 3 minutes. If the update-used software is not divided into several transmission blocks, the mobile terminal device 10 cannot receive a call for about 15 minutes while downloading the update-used software sized 1 MB. Repeating the steps of downloading files for 30 seconds and suspending the downloading operations for 3 minutes, the mobile terminal device 10 takes about 112 minutes to finish downloading a 1 MB sized file. This delay of software updating operation is not a problem. Considering the fact that most users send a call back again 1 to 3 minutes after the line was busy at a first call, the establishment of the 3 minutes interval is rational for keeping a time interval for processing regular device operations.

The mobile terminal device 10 should accept any key input operations even during the downloading of a transmission block for not disturbing a call transmitting or receiving operation by a user. It is preferred that mobile terminal device 10 can interrupt the downloading operation of software at any key input operations by a user.

Accordingly, applying the structure of downloading transmission blocks one by one, the CPU 22 of the mobile terminal device 10 becomes busy only for a short amount of time while downloading each transmission block. By requesting the downloading operation to the software-supply device 50, the mobile terminal device 10 takes a lead in the downloading operation, and can execute other communication operations till requesting the next downloading operation of a block. During this period, the terminal device 10 can accept a call from other terminal devices by being in its waiting state, and can also send a call to other terminal devices. Consequently, the mobile terminal device 10 can keep its primary purpose as a convenient communication device.

During a radio communication associated with the downloading operation of the software, and even during the waiting state of the mobile terminal device 10, the device 10 consumes substantial amount of electricity compared to the time when the device 10 is not connected to the software supply device 50. Accordingly, it is preferred that the downloading operation of the software is stopped when the device 10 is disconnected from a charger not to consume the electricity in the battery cell and not to shorten the total operating time of the device 10.

In the case that the downloading operation of the software is interrupted by any of the above reasons, the downloading operation should resume from the interrupted point. To achieve a useful resumption of the downloading operation, the object of the downloading is divided into small sized transmission blocks and is transmitted. Interrupted downloading operation of the software resumes in each transmission block as a unit. The battery backup RAM 34 records and manages the download progress so as to decide the specific block to start re-downloading. If the contents of the RAM 34 are lost, then the download restarts from the beginning of the update-used software.

Accordingly, even if the downloading operation of a transmission block is suspended at any point, the mobile terminal device 10 can efficiently resume downloading the block which downloading has been suspended, from the beginning of the block by managing downloading order of the transmission blocks. Further, there possibly exists a case that the transmission block misses its data because of interruption and resumption of the downloading operation. In the above-described case, the control of the device 10 can detects any errors by inspecting "check sum" in the download buffer 44.

FIG. 13 is a diagram showing a first stage updating process of the module B. The currently operating software is expressed in the meshed area in the figure. The present control-software 43 including the old module B downloads a new module B. Subsequently, the present control-software 43 halts once so that the update-software 41 can update the module B. After the module B is updated, the version number of the control-software 43 is renewed and the control of the mobile terminal device 10 shifts back from the update-software 41 to the new control-software 43 including the updated module B.

FIG. 14 is a diagram showing of a second stage updating process of the modules C and D. Since the sizes of the modules C and D are less than the size of the download buffer 44, the modules C and D can be updated simultaneously. The present control-software 43 including the old modules C and D downloads new modules C and D, and the present control-software 43 halts once so that the update-software 41 updates the modules C and D. After the modules C and D are updated, the version number of the control-software 43 is renewed and the control of the mobile terminal device 10 shifts back from the update-software 41 to the new control-software 43 including the updated modules C and D. Additionally, using the function possible to update a plurality of modules simultaneously, it is possible to add the large-scaled software modification over the modules C and D in the control-software 43.

In an embodiment of the present invention, each mobile terminal device 10 manages information of its own updating progress so that the software-supply device 50 is required only to transmit the corresponding transmission blocks in response to the block transmission requests from each mobile terminal device 10. Accordingly, it is possible to lower the process load of the software-supply device 50 substantially. The mobile terminal device 10 transmits the request to the software-supply device 50, and receives update-used software as an object of updating with the response from the software-supply device 50. Accordingly, it is not necessary to have a structure to notify update information simultaneously on the network side, and any modifications involving the entire communication system do not have to be added. Therefore, it is expected that such the system be easily introduced only by adding the mobile terminal device 10 and the corresponding software-supply device 50 to the communication system.

Additionally, it should be noted that although the present invention is applied to a TDMA mobile communication system in the above-described embodiment, the present invention may also be applied to other various mobile communication systems with different communication methods, for instance, a CDMA method.

Additionally, it should be noted that the present invention may be applied not only to a large-scaled mobile terminal system described above but also to other general radio systems that can connect a main station and radio terminal stations through radio channels, for instance, a business radio communication system.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 11-251065, filed on Sep. 6, 1999, the entire contents of which are hereby incorporated by reference.

What is claimed is:

1. A method for updating software in a radio terminal device of a mobile communication system, wherein a base station and a radio terminal device are connected mutually through radio communication channels, comprising the steps of:

notifying version information on a control-software presently involved in operations of said radio terminal device to a software-supply device connected to a network by said radio terminal device;

determining a necessity of updating said control-software by comparing the version information received from said radio terminal device with latest version information stored in and managed by said software-supply device;

utilizing the control-software presently involved to download new control-software into a buffer memory of said radio terminal device that is appropriate to update the version of said control-software presently involved, and subsequently utilizing an update-software of said mobile radio terminal device to update said control-software presently involved with said new control-software stored in said buffer memory, if updating of said control-software is needed.

2. The method as claimed in claim 1, wherein the step of notifying version information by said radio terminal device notifies the version information of said control-software involved in operations of said radio terminal device to said software-supply device at regular time intervals.

3. The method as claimed in claim 1, wherein the step of downloading new control-software comprises a step of dividing said new control-software to be downloaded into blocks having a fixed size, said blocks being downloaded intermittently.

4. A radio terminal device comprising:
- a radio communication unit capable of transmitting and receiving digital signals;
- a main memory storing control-software presently involved in operations including a radio communication control of said radio terminal device and update-software for updating said control-software presently involved;
- a buffer memory; and
- a processing unit that operates in accordance with said control software in said main memory,
- wherein said processing unit, under control of said control-software presently involved, causes update-used software downloaded through a radio communication channel to be temporarily stored in said buffer memory and updates, under a control of said update-software, parts of said control-software presently involved with said update-used software, so that the processing unit can operate in accordance with updated control-software.

5. The radio terminal device as claimed in claim 4, wherein said buffer memory has a size than is smaller than that of said control-software and is greater than that of said update-used software.

6. The radio terminal as claimed in claim 5, wherein:
said control-software is divided into several modules which can be updated individually; and
said processing unit updates said several modules by repeating download and updating processes of said modules in order.

7. The radio terminal as claimed in claim 5, wherein:
said update-used software in divided into blocks having a fixed size; and
said processing unit requests download on a block basis and stores a necessary numbers of blocks of said update-used software to said buffer memory in order.

8. The radio terminal as claimed in claim 7, wherein the processing unit manages a transmission order of the blocks and interrupts downloading of said update-used software if a fixed event occurs while downloading.

9. The radio terminal device claimed in claim 4, wherein a part storing said control software in said main memory and said buffer memory include flash ROMs.

10. A software-supply device, comprising:
- a communication interface unit capable of transmitting and receiving digital signals connected to a network;
- a memory storing every version of control-software involved in operations of a radio terminal device and version information on said control-software, said memory including a management table in which the control software is expanded into module information corresponding to a download buffer of the radio terminal device, the module information being divided into fixed size transmission blocks corresponding to transmission block numbers associated with a request for transmission blocks from the radio terminal device; and
- a communication control unit updating and managing contents of said memory, said communication control unit being capable of communication with any radio terminal device through a communication interface device.

11. The software-supply device claimed in claim 10, wherein:
said communication control unit determines whether said control-software used in said radio terminal device is needed to be updated by comparing the version information received from said radio terminal device and a latest one of the version information in said memory; and
said communication control unit selects and downloads new control-software appropriate to update the version of the control-software used in said radio terminal device when it is determined that updating of said control-software is needed.

* * * * *